United States Patent
Crall et al.

(10) Patent No.: US 10,968,771 B2
(45) Date of Patent: Apr. 6, 2021

(54) METHOD AND SYSTEM FOR ICE TOLERANT BLEED TAKEOFF

(71) Applicant: General Electric Company, Schenectady, NY (US)

(72) Inventors: David William Crall, Loveland, OH (US); Charles Daniel Califf, Lawrenceburg, IN (US); Craig William Higgins, Liberty Township, OH (US); Erich Alois Krammer, West Chester, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 432 days.

(21) Appl. No.: 15/405,016

(22) Filed: Jan. 12, 2017

(65) Prior Publication Data

US 2018/0195408 A1     Jul. 12, 2018

(51) Int. Cl.
*F01D 25/02*        (2006.01)
*F02C 9/18*         (2006.01)
(Continued)

(52) U.S. Cl.
CPC .............. *F01D 25/02* (2013.01); *F01D 9/065* (2013.01); *F02C 6/08* (2013.01); *F02C 7/047* (2013.01);
(Continued)

(58) Field of Classification Search
None
See application file for complete search history.

(56) References Cited

U.S. PATENT DOCUMENTS 3,057,154 A * 10/1962 Sherlaw ................. B64D 15/02
                                                       244/134 R
3,341,114 A *  9/1967 Larson .................... F02C 7/047
                                                       244/134 R
(Continued)

FOREIGN PATENT DOCUMENTS

JP        2015-014207 A    1/2015

OTHER PUBLICATIONS

International Search Report and Written Opinion issued in connection with corresponding PCT Application No. PCT/US2017/065025 dated Feb. 26, 2018.
(Continued)

*Primary Examiner* — Justin D Seabe
*Assistant Examiner* — Jason G Davis
(74) *Attorney, Agent, or Firm* — Michele V. Frank; Venable LLP

(57) ABSTRACT

A method and icing effects mitigation system are provided. The icing effects mitigation system includes a fluid duct configured to channel a first flow of fluid through the fluid duct from a duct opening to a rotatable member at least partially positioned within the fluid duct. The rotatable member includes a radially inner rotatable portion and a radially outer rotatable portion. The icing effects mitigation system also includes a duct member extending through the fluid duct in a direction approximately orthogonal to a direction of the first flow of fluid. The duct member is configured to channel a second flow of a second fluid therethrough that causes ice accreted on the duct member to shed on a trajectory that impacts the rotatable member at the radially inner portion.

19 Claims, 3 Drawing Sheets

(51) Int. Cl.
*F02C 7/047* (2006.01)
*F01D 9/06* (2006.01)
*F04D 29/58* (2006.01)
*F02C 6/08* (2006.01)
*B64D 33/02* (2006.01)

(52) U.S. Cl.
CPC ............ *F02C 9/18* (2013.01); *F04D 29/5853* (2013.01); *B64D 2033/0233* (2013.01)

(56) References Cited

U.S. PATENT DOCUMENTS

| | | | | |
|---|---|---|---|---|
| 3,365,124 | A * | 1/1968 | Burge | F04D 29/542 415/115 |
| 4,720,235 | A | 1/1988 | Lachance et al. | |
| 5,029,440 | A * | 7/1991 | Graber | F02C 7/047 244/134 B |
| 5,261,228 | A * | 11/1993 | Shuba | F01D 17/105 60/226.3 |
| 6,561,760 | B2 * | 5/2003 | Wadia | F01D 25/02 415/145 |
| 6,581,978 | B2 | 6/2003 | Li | |
| 6,990,797 | B2 | 1/2006 | Venkataramani et al. | |
| 7,111,982 | B1 * | 9/2006 | Swonger, Jr. | G01K 13/02 374/143 |
| 7,581,920 | B2 * | 9/2009 | Lardellier | F01D 5/145 415/1 |
| 8,277,170 | B2 | 10/2012 | Hess et al. | |
| 8,814,222 | B2 | 8/2014 | Brill | |
| 9,074,531 | B2 * | 7/2015 | Grabowski | F02C 9/20 |
| 9,297,259 | B2 * | 3/2016 | Miller | F01D 5/141 |
| 9,371,736 | B2 | 6/2016 | Brill | |
| 9,982,598 | B2 * | 5/2018 | Pritchard, Jr. | F02K 3/075 |
| 10,196,982 | B2 * | 2/2019 | Dede | F04D 29/584 |
| 2002/0182059 | A1 | 12/2002 | Escure et al. | |
| 2009/0282834 | A1 | 11/2009 | Hein | |
| 2011/0079018 | A1 | 4/2011 | Pucovsky et al. | |
| 2013/0283762 | A1 | 10/2013 | Simpson et al. | |

OTHER PUBLICATIONS

European Search Report Corresponding to Application No. 17891849 dated Jul. 15, 2020.

* cited by examiner

METHOD AND SYSTEM FOR ICE TOLERANT BLEED TAKEOFF

BACKGROUND

This description relates to gas turbine engines, and, more particularly, to a method and a system for mitigating the effects of gas turbine engine icing.

At least some known commercial turbofan engines bleed air from an inner flow path aft of the fan outlet guide vanes (OGVs) and upstream from the booster or low pressure compressor to supply loads, such as, an active clearance control (ACC) system. More specifically, a bleed scoop in the stator assembly outer band channels the extracted air to a bleed plenum for the clearance control system. However, the effectiveness of the clearance control system may be reduced because of the long-duct-mixed-flow architecture and because the pressure of the extracted air drops as it passes through the bleed scoop, the flow path from the OGVs of some engines does not have a pressure that is high enough to satisfy requirements of the active clearance control (ACC) system. In some known engines, the bleed off-take was moved to a higher pressure location downstream of the booster or low pressure compressor to improve the low pressure condition, however the solution may introduce a potential for ice to accrete on the bleed scoop. An improved ice tolerant bleed takeoff is desired.

BRIEF DESCRIPTION

In one embodiment, an icing effects mitigation system includes a fluid duct configured to channel a first flow of fluid through the fluid duct from a duct opening to a rotatable member at least partially positioned within the fluid duct. The rotatable member includes a radially inner rotatable portion and a radially outer rotatable portion. The icing effects mitigation system also includes a duct member extending through the fluid duct in a direction approximately orthogonal to a direction of the first flow of fluid. The duct member is configured to channel a second flow of a second fluid therethrough that causes ice accreted on the duct member to shed on a trajectory that impacts the rotatable member at the radially inner portion.

In another embodiment, a method of protecting an engine from icing is provided. The engine includes a rotatable bladed member. The method includes positioning one or more engine components in an inner flow path of the engine, operating the engine in a first mode that permits ice accretion on the one or more components, and operating the engine in a second mode that causes accreted ice to shed only from positions determined to impart a trajectory to the accreted ice that carries the accreted ice into a radially inner span of the rotatable bladed member.

In yet another embodiment, a gas turbine engine includes a bladed booster rotor that is rotatable about a rotational axis and a high pressure compressor (HPC) bladed rotor rotatable about the rotational axis in serial flow communication with the bladed booster rotor and downstream of the bladed booster rotor. The gas turbine engine also includes a fluid duct defining a first flow path and extending between the bladed booster rotor and the HPC bladed rotor, the duct is configured to channel a first flow of fluid through the flow path from the bladed booster rotor to the HPC bladed rotor. The gas turbine engine further includes a strut including a radially inner end and a radially outer end, the strut extending at least partially through the first flow path and defining a second flow path. The strut is configured to restrict a second flow of fluid through the second flow path during a first mode of operation permitting ice to accrete on the strut. The strut is also configured to channel the second flow of fluid through the second flow path during a second mode of operation causing ice to shed from the strut. The second flow path is positioned in the radially inner end of the strut.

BRIEF DESCRIPTION OF THE DRAWINGS

FIG. 1 is a side view of an exemplary aircraft turbofan gas turbine engine circumscribed about an engine axis of rotation and configured to be mounted to a wing or fuselage of an aircraft.

FIG. 2 is a side view of an icing protection system for a machine in accordance with an example embodiment of the present disclosure.

FIG. 3 is a side view of an icing protection system in accordance with another example embodiment of the present disclosure.

Figure 1:
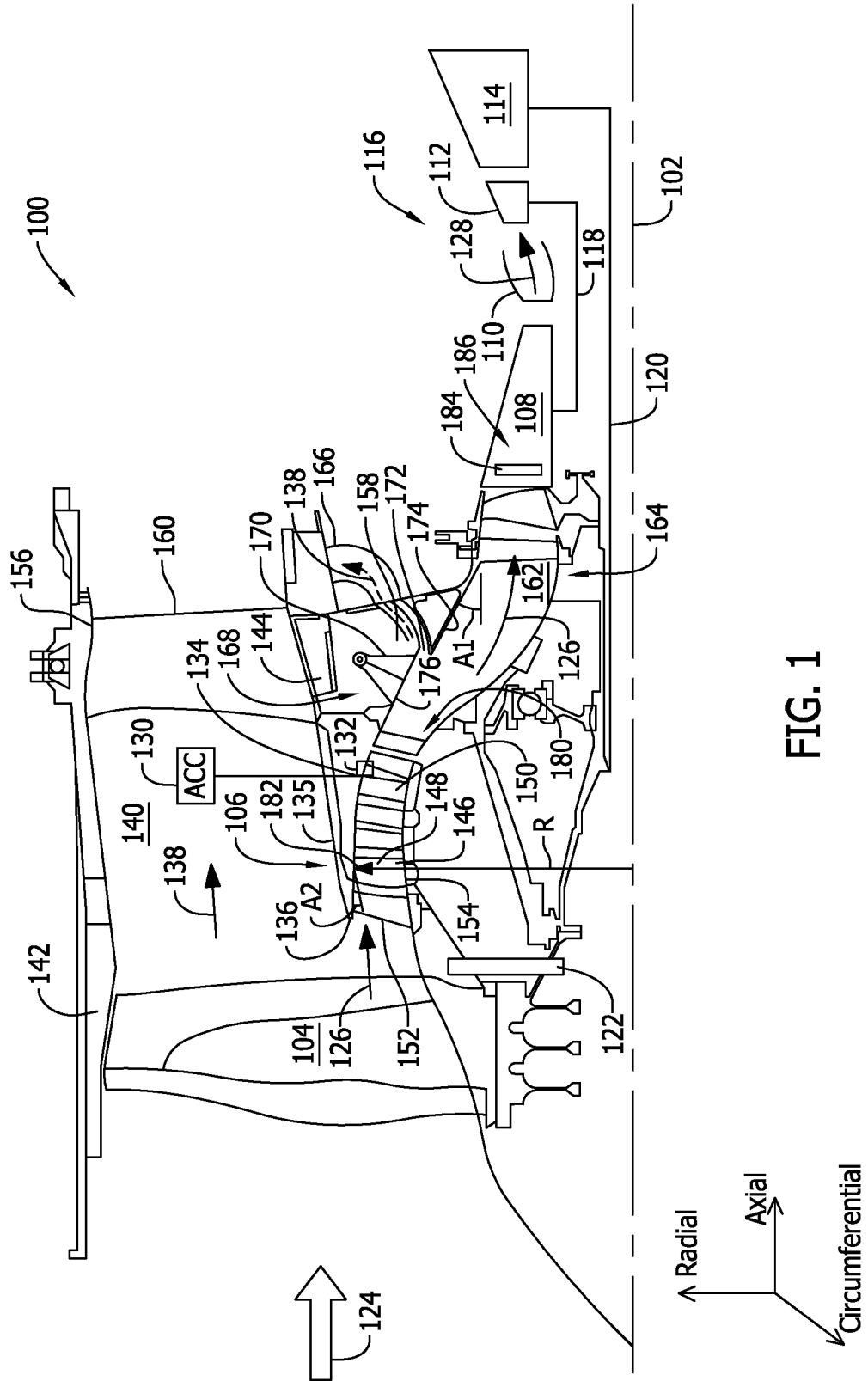
FIGS. 1-3 show example embodiments of the method and system described herein.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

Embodiments of an icing effects mitigation system are described herein. In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "axial" and "axially" refer to directions and orientations that extend substantially parallel to a centerline or rotational axis of the turbine engine. Moreover, the terms "radial" and "radially" refer to directions and orientations that extend substantially perpendicular to the rotational axis of the turbine engine. In addition, as used herein, the terms "circumferential" and "circumferentially" refer to directions and orientations that extend arcuately about the rotational axis of the turbine engine.

Embodiments of the compressor bleed take-off systems described herein provide a cost-effective method for providing a bleed off-take that is located on the radially inner side of a strut in such a manner as to shed ice in a way that does not cause mechanical damage to downstream turbomachinery. Other embodiments include placing the bleed on the top half of the engine to allow gravity to improve the trajectory into the hub.

Traditionally commercial turbofan engines have bled air from the inner flow path downstream of the OGV's. Because of the long-duct-mixed-flow architecture, the OGV flow path of some engines did not have enough pressure to satisfy the ACC system. The bleed off-take was moved to a higher pressure location aft of the booster, which provided adequate pressure, but also introduced a potential for ice buildup. By moving the bleed scoop to a radially inner end of the strut and/or positioning duct features in the vertically upper portion of the duct, any ice shed would harmlessly impact the root of the first stage compressor blade.

Other features and components placed in the inner flow path such as temperature sensors, variable bleed valve (VBV) lips, VBV off-takes, and OGV flow paths may create potential ice sheds. As described herein, embodiments of the present disclosure position such components in an area where the trajectory of the ice shed particles is carried into the hub and/or the roots of the blades of the high pressure compressor. Although described in relation to a gas turbine engine the present disclosure is also applicable to various other rotatable machinery.

FIG. 1 is a side view of an exemplary aircraft turbofan gas turbine engine 100 circumscribed about an engine rotational axis 102 and configured to be mounted to a wing or fuselage of an aircraft. Engine 100 includes, in downstream serial flow communication, a fan 104, a low pressure compressor (LPC) or booster 106, a high pressure compressor (HPC) 108, a combustor 110, a high pressure turbine (HPT) 112, and a low pressure turbine (LPT) 114. A core engine 116 includes HPT 112 joined by a high pressure drive shaft 118 to HPC 108 and combustor 110. LPT 114 is joined by a low pressure drive shaft 120 to both fan 104 and booster 106. In some embodiments, fan 104 and booster 106 are coupled together through a gearbox 122 configured to change a speed of fan 104 with respect to booster 106.

In various embodiments, high bypass aircraft gas turbine engines may have more than two compressors and turbines. For example, a three spool engine may include three compressors, each of which is driven by a different turbine. Accordingly, an icing effects mitigation system (shown in FIG. 2) disclosed herein may be incorporated between two compressors and is not limited to being only between a low pressure compressor such as booster 106 illustrated herein and HPC 108.

In typical operation, air 124 is pressurized by fan 104 and produces an inner or core airflow 126 channeled through booster 106, which further pressurizes core airflow 126. Pressurized core airflow 126 is then channeled to HPC 108 which further pressurizes the air. The pressurized air is mixed with fuel in combustor 110 for generating hot combustion gases 128 that flow downstream, in turn, through HPT 112 and LPT 114.

In some embodiments, a portion of the air pressurized by booster 106 is extracted or bled from booster 106 and directed to an active clearance control (ACC) system 130. More specifically, a bleed scoop 132 in a stator assembly outer band 134 or a strut channels the extracted air to a bleed plenum for an active clearance control system 130. However, the effectiveness of ACC system 130 may be reduced because the pressure of the extracted air drops as it passes through bleed scoop 132. Further, bleed scoop 132 can provide compressed air with both static and dynamic pressure components.

A flow splitter 135 surrounding booster 106 immediately behind fan 104 includes a sharp leading edge 136 which splits fan air 124 pressurized by fan 104 into a radially inner stream (core airflow 126) channeled through booster 106 and a radially outer stream or bypass airflow 138 is channeled through a bypass duct 140 spaced radially outwardly from booster 106. A fan casing 142 surrounding fan 104 and bypass duct 140 are supported by an annular fan frame 144 circumscribed about engine rotational axis 102. Booster 106 includes alternating annular rows 146 of booster blades 148 and vanes 150 extending radially outwardly and inwardly across a booster flow path 152 in a booster duct 154. The annular row of booster blades 148 are suitably joined to fan 104. Booster 106 is located forward of fan frame 144 and radially inboard of flow splitter 135.

Fan frame 144 includes an annular outer frame casing 156, a fan hub frame 158, and a plurality of circumferentially spaced apart bypass duct struts 160 extending therebetween. Bypass duct struts 160 are airfoil shaped because bypass air 138 passes between adjacent ones thereof. A transition duct 162 also referred to as a gooseneck is located at a radially inner end 164 of fan hub frame 158 and is axially disposed between and in fluid communication with booster 106 and high pressure compressor 108 of core engine 116. Bleed exhaust ducts 166 lead away from fan hub frame 158 to bypass duct 140.

At idle power and during deceleration (due to momentum), fan 104 of turbo fan engine 100 will try to pump too much air into HPC 108. To overcome this, engine 100 is fitted with a variable bleed apparatus 168 including one or more variable bleed valves (VBV) 170. During these stages of engine operation VBV's 170 will open to vent some of the excess air into bypass duct 140. A bleed inlet 172, an opening, is formed in an outer annular wall 174 of transition duct 162 between booster 106 and HPC 108. In some embodiments, outer annular wall 174 has a conical shape and in other embodiments, outer annular wall 174 is curved or arcuate. Variable bleed apparatus 168 is used to bleed core airflow 126 between booster 106 and HPC 108 to prevent booster 106 from stalling under certain engine operating conditions. Variable bleed apparatus 168 includes variable bleed valve 170 and is used to bleed air and extract ice from booster 106 and transition duct 162 before it reaches HPC 108 where it can cause stall conditions, airflow instability conditions, and quench the flame or combustion in combustor 110.

Variable bleed valve 170 is designed to be operated with VBV door 176 in a fully closed or in a closed position and in first and second or partial and full open positions. When variable bleed valve 170 is operated with VBV door 176 fully closed or in the closed position, no bleed air 178 is removed from core airflow 126 and no ice is removed from transition duct 162 through VBV 176. Ice and other particle removal is enhanced by further turning core airflow 126 radially inwardly towards engine rotational axis 102 and high pressure compressor 108 in transition duct 162 after it exits a booster outlet 180 leading to transition duct 162. Also, a booster outer flow path 182 has a relatively high radius R, as measured from engine rotational axis 102, over the last few stages of booster 106. This flow turning is accomplished by outer annular wall 174 of transition duct 162 having a transition duct conical angle A1, with respect to engine rotational axis 102, greater than a booster conical angle A2.

In some embodiments, core airflow 126 exiting booster 106 flows linearly on a path that is tangent to the outer flow path of booster outlet 180. In an ice shed, the ice particles follow this same path or trajectory with most of the ice being located in the outer portion of flow path 182. Conventionally, the flow direction set by outer flow path 152 of booster outlet 180 is parallel to VBV door 176.

Core airflow 126 in booster 106 and transition duct 162 stays attached to outer annular wall 174, and turns down into HPC 108 because of its difference in conical angles. However, ice particles have too much mass and inertia to make this turn, and they continue on their straight trajectory out of booster 106. Such a trajectory would permit ice shed from components in transition duct 162 to continue into radially outer ends of blades 184 of a first stage 186 of HPC 108.

Figure 2:
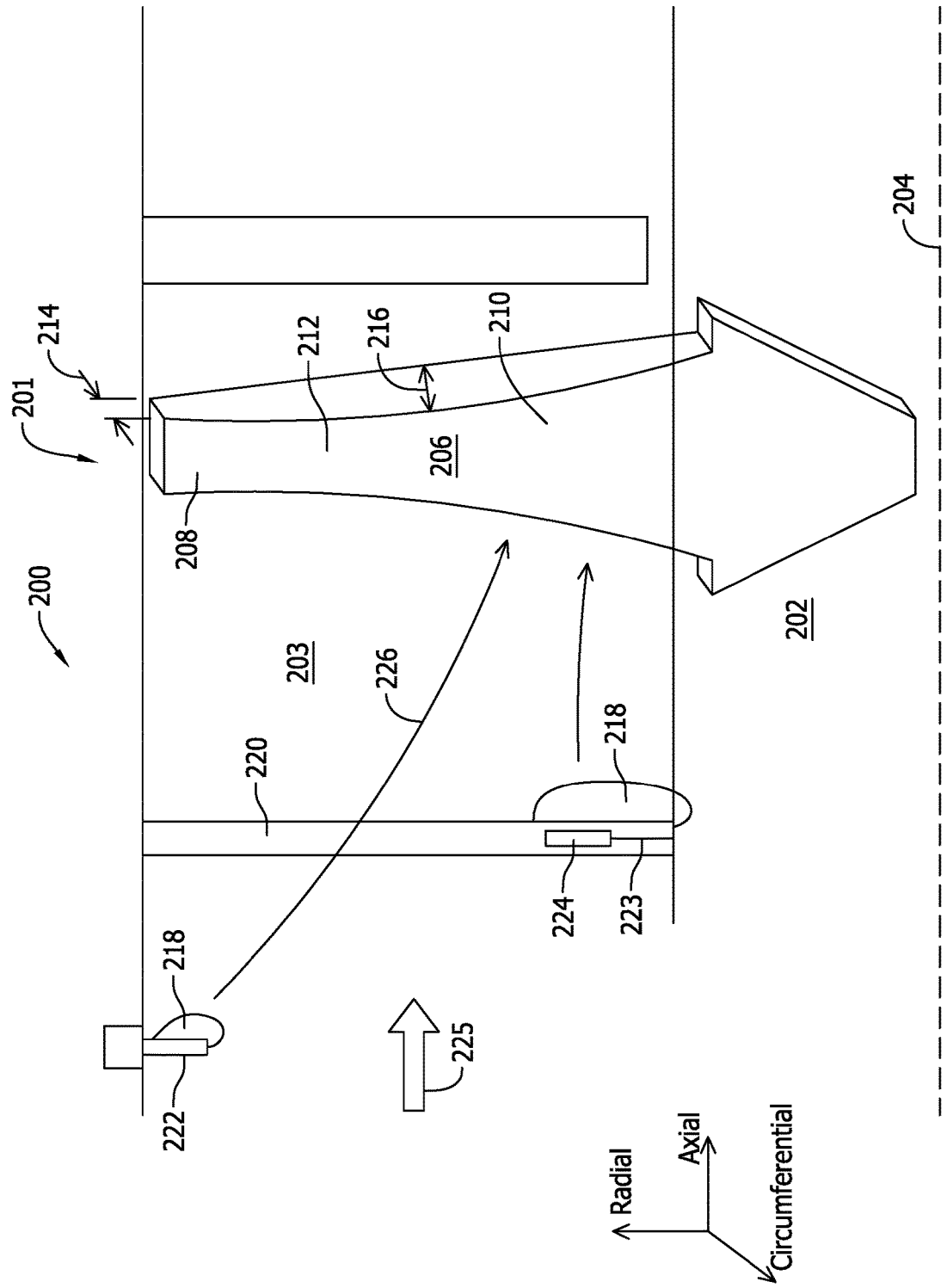

FIG. 2 is a side view of an icing protection system 200 for a machine 201 in accordance with an example embodiment of the present disclosure. In the example embodiment, a bladed rotatable member 202, such as, a compressor rotor is rotatable in an annular flow duct 203 (upper portion shown in FIG. 2) about an axis 204. Bladed rotatable member 202 includes a plurality of circumferentially spaced blades 206. Each blade 206 of plurality of blades 206 includes a radially outer tip portion 208, a radially inner root portion 210, and an airfoil portion 212 extending therebetween. In the example embodiment, radially outer tip portion 208 includes a first thickness 214, radially inner root portion 210, includes a second thickness 216, and an airfoil portion 212 includes a thickness that varies, typically between first thickness 214 and second thickness 216, however, the thickness of airfoil portion 212 may be thinner than first thickness 214 and/or thicker than second thickness 216.

A plurality of instrument sensing elements, control elements, heat exchangers, and struts may be positioned in flow duct 203. During certain machine operating modes and/or environmental conditions, ice 218 may accrete on certain components positioned within flow duct 203, for example, a strut 220 and/or a temperature sensor 222.

During operation, ice accretion on components 220, 222 may proceed at different rates and may be shed at different rates, sometimes due to the particular operation of the associated component. For example, ice 218 may accrete on strut 220 at a different rate than ice 218 accretes on temperature sensor 222. Moreover, temperature sensor 222 may be a thermally static component that does not provide heat energy or remove heat energy from its surface. Ice shedding from temperature sensor 222 is largely influenced from external conditions rather than the operation of temperature sensor 222 itself. On the other hand, strut 220 may include internal or external features that do add or remove heat energy from its surface. One such feature includes a bleed supply conduit 223 and/or bleed scoop 224 configured to supply downstream loads with bleed air, such as, for example, an active clearance control system 130. In this case, ice shedding may occur regularly under the influence of the operation of strut 220. In some embodiments, strut 220 may be used to transport fluids, such as, but not limited to, air, oil, fuel, and the like, across flow duct 203. The flow of these fluids may start and stop under the control of other components and may occur on a regular frequency or may occur randomly.

Air flow 225 flowing through flow duct 203 tends to carry any entrained particles including ice 218 axially through flow duct 203. Accordingly, ice 218 forming on a radially inner span of strut 220 will tend to be carried into radially inner root portion 210 of plurality of blades 206, which is a relatively thicker and stronger portion of blades 206. Components, such as, temperature sensor 222, which are mounted in the upper half of flow duct 203 may also shed ice 218, however, if the mounting of such components is restricted to only the upper half of flow duct 203, gravity will additionally influence the trajectory 226 of ice 218 to carry ice 218 radially inwardly into radially inner root portion 210 of plurality of blades 206.

Figure 3:
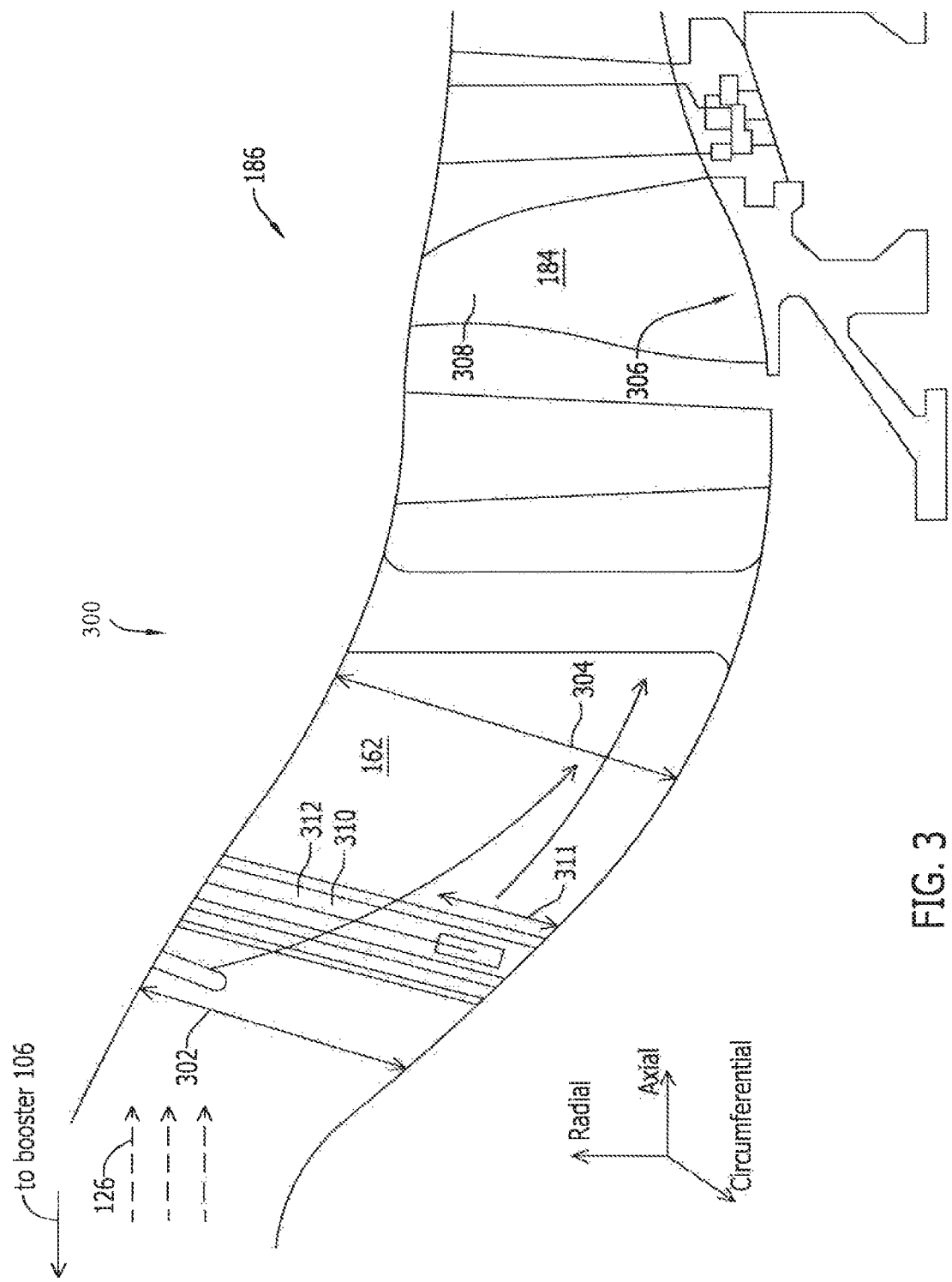

FIG. 3 is a side view of an icing protection system 300 in accordance with another example embodiment of the present disclosure. In the example embodiment, icing protection system 300 facilitates reducing the effects of ice shed from components in transition duct 162 and upstream from transition duct 162. Icing protection system 300 includes transition duct 162 configured to channel first core airflow 126 through transition duct 162 from a duct opening such as booster outlet 180 to a rotatable member, such as, first stage 186 of HPC 108 at least partially positioned within transition duct 162. In various embodiments, transition duct 162 includes an arcuate flow path 152 and in some embodiments, transition duct 162 includes at least one of a converging cross-section 302 and a diverging cross-section 304. First stage 186, includes a plurality of blades 184 having a radially inner rotatable root portion 306 and a radially outer rotatable tip portion 308.

Icing protection system 300 further includes a duct member, such as, a strut 310 extending through transition duct 162 in a direction approximately orthogonal to a direction 311 of the first flow of fluid, core airflow 126. Strut 310 is configured to channel a second flow 312 of a second fluid therethrough that causes ice accreted on strut 310 to shed on a trajectory that impacts rotatable member 202 at radially inner root portion 306. In one embodiment, strut 310 is configured to channel second flow 312 of the second fluid to active clearance control (ACC) system 130 (shown in FIG. 1).

Strut 310 is configured to channel second flow 312 of the second fluid intermittently to, for example, ACC 130 (shown in FIG. 1) such that ice accretion occurs intermittently during a first mode of operation where second flow 312 is stopped and ice sheds during a second mode of operation where second flow 312 is flowing through strut 310. The first mode of operation may be, for example, a high engine power maneuver, such as, a take-off or climb where bleed air from booster 106, HPC 108, and/or transition duct 162 is used in ACC 130 (shown in FIG. 1). The second mode of operation may be, for example, aircraft cruising flight.

In the example embodiment, rotatable member 202 includes a plurality of airfoil blades 184, each of plurality of airfoil blades 184 includes a radially inner rotatable root portion 302 and a radially outer rotatable tip portion 308. Radially inner rotatable root portion 306 includes a first thickness (a dimension going into the page) and radially outer rotatable tip portion 308 includes a second thickness (a dimension going into the page), the first thickness being greater than the second thickness. The greater thickness of the root area or radially inner rotatable root portion 306 permits radially inner rotatable root portion 306 to withstand ice impacts more readily than the relatively thinner radially outer rotatable tip portion 308. By directing shed ice from, for example, a radially inner portion of strut 310, the trajectory of the shed ice carries the shed ice into thicker radially inner rotatable root portion 306 of airfoil blades 184. This portion of blades 184 is also rotating at a lower angular velocity than radially outer rotatable tip portion 308, thereby further reducing the effects of an impact with the shed ice.

During operation, strut 310 is configured to channel the second flow 312 of the second fluid intermittently such that ice accretion on strut 310 occurs intermittently during a first mode of operation where second flow 312 is stopped or prevented from flowing through strut 310 and ice sheds occur during a second mode of operation where second flow 312 is flowing through strut 310. To facilitate ice sheds impacting only radially inner rotatable root portion 306 any sensors or other features where ice is prone to accrete, such sensors and features are positioned at a vertically upper portion of transition duct 162. Positioning the features in vertically upper portion of transition duct 162 uses the effects of gravity to carry the shed ice 218 into radially inner rotatable root portion 306. For features that would be placed in a vertically lower portion of transition duct 162, gravity would tend to carry the shed ice 218 into relatively thinner radially outer rotatable tip portion 308, which could damage radially outer rotatable tip portion 308.

The foregoing detailed description illustrates embodiments of the disclosure by way of example and not by way of limitation. It is contemplated that the disclosure has general application to managing trajectories of environmental elements in airflow systems. It is further contemplated that the methods and systems described herein may be incorporated into existing machine operation and control systems or in the machine itself, in addition to being maintained as a separate stand-alone apparatus.

While the disclosure has been described in terms of various specific embodiments, it will be recognized that the disclosure can be practiced with modification within the spirit and scope of the claims.

The above-described embodiments of an icing effects mitigation system provides a cost-effective and reliable means for protecting components positioned downstream of ice forming features from impact damage when the ice sheds and is carried downstream. More specifically, the methods and systems described herein facilitate directing shed ice into more robust portions of structures in the flow path or to miss impacting the structure when possible. As a result, the methods and systems described herein facilitate efficient operation and reduced maintenance of the associated machine in a cost-effective and reliable manner.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An icing effects mitigation system comprising:
    a fluid duct configured to channel a first flow of fluid through the fluid duct from a duct opening to a rotatable member at least partially positioned within the fluid duct, the rotatable member comprising an inner rotatable portion and an outer rotatable portion along a radial direction; and
    a duct member extending through said fluid duct in a direction approximately orthogonal to a direction of the first flow of fluid, said duct member including a bleed scoop configured to channel a second flow of a second fluid therethrough that causes ice accreted on the duct member to shed on a trajectory that impacts the rotatable member at the inner rotatable portion,
    wherein the fluid duct extends between an outlet of a bladed booster rotor and an inlet of a high pressure compressor (HPC) bladed rotor, and wherein the duct member extends through the fluid duct at a location between the outlet of the bladed booster rotor and the inlet of the HPC bladed rotor, wherein said duct member is configured to channel the second flow of the second fluid intermittently such that ice accretion occurs intermittently during a first mode of operation where the second flow is stopped and ice sheds during a second mode of operation where the second flow is flowing through the duct member, and wherein the first mode of operation is a take-off engine power condition and the second mode of operation is a cruising engine power condition.

2. The icing effects mitigation system of claim 1, wherein said inner rotatable portion comprises a first thickness and said outer rotatable portion comprises a second thickness, said first thickness greater than said second thickness, and wherein the fluid duct includes a converging duct portion and a diverging duct portion downstream of the converging duct portion.

3. The icing effects mitigation system of claim 1, wherein said rotatable member comprises a plurality of airfoil blades, each of the plurality of airfoil blades comprising an inner rotatable root portion and an outer rotatable tip portion along the radial direction.

4. The icing effects mitigation system of claim 1, wherein said fluid duct comprises an arcuate flow path.

5. The icing effects mitigation system of claim 1, wherein said fluid duct comprises a converging cross-section.

6. The icing effects mitigation system of claim 1, further comprising one or more sensors positioned at a vertically upper portion of said fluid duct.

7. The icing effects mitigation system of claim 1, wherein said duct member comprises an active clearance control (ACC) supply conduit.

8. The icing effects mitigation system of claim 1, further comprising a second bleed scoop in a stator assembly outer band.

9. A method of protecting an engine from icing, the engine including a rotatable bladed member, said method comprising:
    positioning one or more engine components in an inner flow path of the engine between an outlet of a bladed booster rotor and an inlet of a high pressure compressor (HPC) bladed rotor;
    operating the engine in a first mode that permits ice accretion on the one or more engine components, wherein the first mode is a take-off engine power condition; and
    operating the engine in a second mode that causes accreted ice to shed from positions determined to impart a trajectory to the accreted ice that carries the accreted ice into an inner span along a radial direction of the rotatable bladed member, wherein the second mode is a cruising engine power condition, wherein the one or more engine components include a bleed scoop configured to cause ice accreted to shed.

10. The method of claim 9, wherein the rotatable bladed member comprises a plurality of circumferentially spaced blades, each blade of the plurality of circumferentially spaced blades comprises an outer blade tip portion, an inner blade root portion, and an airfoil spanning therebetween along the radial direction, a thickness of the airfoil is defined between a suction side surface of the airfoil and a pressure side surface of the airfoil, the outer blade tip portion comprises a first thickness, the inner blade root portion comprises a second thickness, the second thickness being greater than the first thickness and operating the engine comprises operating the engine to cause accreted ice to shed into the inner span of the rotatable bladed member.

11. The method of claim 9, wherein positioning the one or more engine components in the inner flow path of the engine comprises positioning the one or more engine components in a vertically upper portion of the inner flow path of the engine.

12. The method of claim 11, wherein positioning the one or more engine components in the vertically upper portion of the inner flow path of the engine comprises positioning one or more engine sensors in the vertically upper portion of the inner flow path of the engine.

13. The method of claim 9, wherein the rotatable bladed member comprises a gas turbine engine compressor stage, wherein said operating the engine in the second mode comprises operating the engine to cause accreted ice to shed into the inner span of the gas turbine engine compressor stage.

14. A gas turbine engine comprising:
a bladed booster rotor rotatable about a rotational axis;
a high pressure compressor (HPC) bladed rotor rotatable about the rotational axis in serial flow communication with said bladed booster rotor and downstream of said bladed booster rotor;
a fluid duct defining a first flow path and extending between an outlet of said bladed booster rotor and an inlet of said HPC bladed rotor, said fluid duct configured to channel a first flow of fluid through the first flow path from said bladed booster rotor to said HPC bladed rotor; and
a strut comprising an inner end and an outer end along a radial direction, said strut including a bleed scoop, said strut extending at least partially through the first flow path, said strut extending through the fluid duct at a location between the outlet of the bladed booster rotor and the inlet of the HPC bladed rotor, said strut defining a second flow path, said strut configured to restrict a second flow of fluid through the second flow path during a first mode of operation permitting ice to accrete on said strut, said strut and said bleed scoop configured to channel the second flow of fluid through the second flow path during a second mode of operation causing ice to shed from the strut, said second flow path positioned in the inner end of said strut wherein said strut is configured to channel the second flow of fluid intermittently such that ice accretion occurs intermittently during the first mode of operation where the second flow is stopped and ice sheds during the second mode of operation where the second flow is flowing through the fluid duct, and wherein the first mode of operation is a take-off engine power condition and the second mode of operation is a cruising engine power condition.

15. The gas turbine engine of claim 14, wherein an inner portion of the HPC bladed rotor comprises a first thickness and an outer portion of the HPC bladed rotor comprises a second thickness, said first thickness being greater than said second thickness.

16. The gas turbine engine of claim 14, wherein said HPC bladed rotor comprises a plurality of airfoil blades, each of the plurality of airfoil blades comprising an inner rotatable root portion and an outer rotatable tip portion along the radial direction.

17. The gas turbine engine of claim 14, wherein said fluid duct comprises an arcuate flow path.

18. The gas turbine engine of claim 14, wherein said fluid duct comprises a converging cross-section.

19. The gas turbine engine of claim 14, wherein said fluid duct comprises a converging cross-section and a diverging cross-section in serial flow relationship.

\* \* \* \* \*